United States Patent
Hashimoto et al.

(10) Patent No.: US 9,946,286 B2
(45) Date of Patent: *Apr. 17, 2018

(54) INFORMATION PROCESSING APPARATUS, POWER-CONSUMING BODY, INFORMATION PROCESSING METHOD, AND PROGRAM

(71) Applicant: NEC Corporation, Minato-ku, Tokyo (JP)

(72) Inventors: Ryo Hashimoto, Tokyo (JP); Hitoshi Yano, Tokyo (JP); Hisato Sakuma, Tokyo (JP); Koji Kudo, Tokyo (JP); Eisuke Saneyoshi, Tokyo (JP); Yuma Iwasaki, Tokyo (JP); Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

This patent is subject to a terminal disclaimer.

(21) Appl. No.: 14/429,494

(22) PCT Filed: Sep. 20, 2013

(86) PCT No.: PCT/JP2013/075459
§ 371 (c)(1),
(2) Date: Mar. 19, 2015

(87) PCT Pub. No.: WO2014/050735
PCT Pub. Date: Apr. 3, 2014

(65) Prior Publication Data
US 2015/0220098 A1 Aug. 6, 2015

(30) Foreign Application Priority Data

Sep. 27, 2012 (JP) ................. 2012-213745

(51) Int. Cl.
*G05F 1/66* (2006.01)
*G06Q 50/06* (2012.01)
(Continued)

(52) U.S. Cl.
CPC ............ *G05F 1/66* (2013.01); *B60L 11/1824* (2013.01); *B60L 11/1844* (2013.01);
(Continued)

(58) Field of Classification Search
CPC G05F 1/66; B60L 11/18; G05B 15/02; G06Q 50/06; H02J 3/32; H02J 3/14; Y04S 10/60
See application file for complete search history.

(56) References Cited

U.S. PATENT DOCUMENTS

2009/0062967 A1* 3/2009 Kressner ................. B60L 11/14
700/286
2011/0184587 A1* 7/2011 Vamos ................. B60L 11/1824
700/297
2012/0123995 A1 5/2012 Boot

FOREIGN PATENT DOCUMENTS

JP 2009-124885 A 6/2009
JP 2009-165254 A 7/2009
(Continued)

OTHER PUBLICATIONS

Machine translation of JP 2012-080748, Takada Takayuki, In-Vehicle Navigation Device and Charging/Discharging Control Method of In-Vehicle Battery, Apr. 19, 2012, 11 pages.*

(Continued)

*Primary Examiner* — Robert Fennema
*Assistant Examiner* — Tri T Nguyen

(57) ABSTRACT

A time point range setting unit (110) sets an operation startable time point when an operation is startable, and an operation end target time point which is a latest time point
(Continued)

among time points when the operation is to be ended, with respect to each of plural power-consuming bodies (20). A necessary operation time setting unit (120) sets a necessary operation time with respect to each of the plural power-consuming bodies (20). A shape information obtaining unit (130) obtains shape information from a schedule management apparatus (40). The shape information represents an assumed shape of a transition line indicating transition in the amount of power supplied in a target period. A demand transition setting unit (140) determines power demand transition information indicating transition in electrical energy demand in the target period so that the necessary operation time is obtained and the transition in the electrical energy demand generated by the plural power-consuming bodies (20) being operated follows the assumed shape.

28 Claims, 18 Drawing Sheets

(51) Int. Cl.
  *G05B 15/02*   (2006.01)
  *H02J 3/32*   (2006.01)
  *B60L 11/18*   (2006.01)
  *H02J 3/14*   (2006.01)

(52) U.S. Cl.
  CPC .............. *G05B 15/02* (2013.01); *G06Q 50/06* (2013.01); *H02J 3/32* (2013.01); *B60L 2230/40* (2013.01); *B60L 2240/70* (2013.01); *B60L 2240/80* (2013.01); *H02J 3/14* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01); *Y04S 10/60* (2013.01)

(56) References Cited

FOREIGN PATENT DOCUMENTS

| JP | 2010-512727 A | 4/2010 |
|---|---|---|
| JP | 2010-213502 A | 9/2010 |
| JP | 2010-539866 A | 12/2010 |
| JP | 2012-110218 A | 6/2012 |
| WO | 2012-093638 A1 | 7/2012 |
| WO | 2012-0120736 A1 | 9/2012 |

OTHER PUBLICATIONS

Yano et al., A Novel Charging-Time Control Method for Numerous EVs based on a Period Weighted Prescheduling for Power Supply and Demand Balancing, Jan. 20, 2012, 6 pages.*
Ninomiya et al, "Denki jidosha wo mochiita taiyoko hatsuden no shutsuryoku hendo yokusei no. ichi kosatsu", IEEJ Power and Energy Technical Meeting Collected Lectures (2011), Lecture No. P40, pp. 83-84, Aug. 30-Sep. 1, 2011.
H. Yano et al, "A Novel Charging-Time Control Method for Numerous EVs based on a Period Weighted Prescheduling for Power Supply and Demand Balancing", ISGT, pp. 156-162, 2012.
International Search Report for PCT Application No. PCT/JP2013/075459, dated Oct. 15, 2013.
Japanese Office Action for JP Application No. 2014-538464 dated Oct. 10, 2017 with English Translation.

* cited by examiner

FIG. 11
(a)
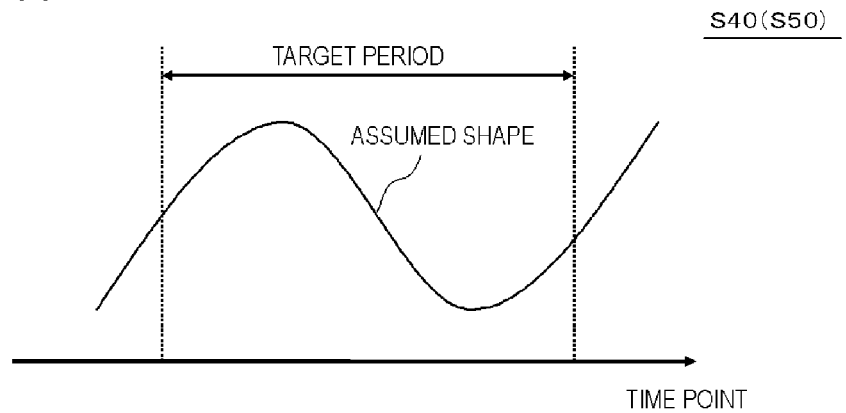
(b)
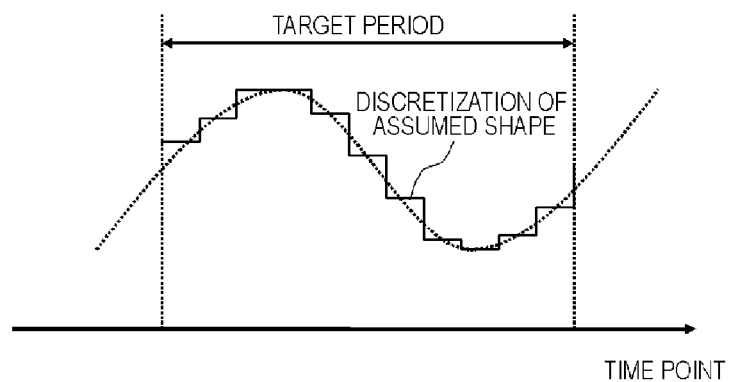

INFORMATION PROCESSING APPARATUS, POWER-CONSUMING BODY, INFORMATION PROCESSING METHOD, AND PROGRAM

This application is a National Stage Entry of PCT/JP2013/075459 filed on Sep. 20, 2013, which claims priority from Japanese Patent Application 2012-213745 filed on Sep. 27, 2012, the contents of all of which are incorporated herein by reference, in their entirety.

TECHNICAL FIELD

The present invention relates to an information processing apparatus, a power-consuming body, an information processing method, and a program that supports setting of a power demand schedule.

BACKGROUND ART

In order to efficiently use power, it is preferable to match power demand and power supply. Generally, the amount of power supplied is determined such that it matches power demand prediction.

In this regard, Patent Document 1 discloses a technique in which a management apparatus is provided in manufacturing equipment or the like of a consumer of electricity and a desired value of power consumption is transmitted to the management apparatus.

Further, Patent Document 2 discloses a technique in which it is assumed that a battery of an electric vehicle is a distributed power resource and plural power resources are controlled according to a predetermined schedule.

On the other hand, in recent years, power generation using renewable energy, such as photovoltaic battery power generation or wind power generation, has been developed. These power generation methods have difficulties in controlling a power generation amount. In this case, it is difficult to maintain a balance between power supply and demand.

In this regard, Non-Patent Document 1 discloses a technique in which output variation of solar battery power generation is suppressed using an electric vehicle. Further, Non-Patent Document 2 discloses the following technique. First, a charging time period of an electric vehicle and a total charging power target are set with respect to a power generation and demand schedule in which surplus power that is predicted in advance is considered. Further, in daily operation, the priority of charging necessity is determined for plural electric vehicles and the necessary number of electric vehicles is selected to achieve the total charging power target.

RELATED DOCUMENT

Patent Document

[Patent Document 1] Japanese Unexamined Patent Publication No. 2009-124885
[Patent Document 2] PCT Japanese Translation Patent Publication No. 2010-512727

Non-Patent Document

[Non-Patent Document 1] Ninomiya et al, IEEJ Power and Energy Technical Meeting Collected Lectures (2011), Lecture No. P40, pp. 83-84, Aug. 30-Sep. 1, 2011, "Denki jidosha wo mochiita taiyoko hatsuden no shutsuryoku hendo yokusei no ichi kosatsu"
[Non-Patent Document 2] H. Yano et al, ISGT, pp. 156-162, 2012, "A Novel Charging-Time Control Method for Numerous EVs based on a Period Weighted Prescheduling for Power Supply and Demand Balancing"

DISCLOSURE OF THE INVENTION

The inventors considered that if a demand target is arbitrarily set in a target period, it may not be possible to realize the demand target. For example, when an excessively large value is set as the demand target, the number of electric vehicles that performs charging during the period may be too small to secure electrical energy for charging. Thus, if the demand target is achieved when the target period starts, the demand may not be maintained in a second half of the target period. Contrarily, when a desired value is set to be small in order to reliably achieve the demand target, a capability to stabilize a balance between supply and demand that is an original purpose is reduced.

An object of the invention is to provide an information processing apparatus, a power-consuming body, an information processing method, and a program, capable of supporting setting of an appropriate demand schedule.

According to an aspect of the invention, there is provided an information processing apparatus including: a time point range setting unit that sets an operation startable time point when an operation is startable, and an operation end target time point which is a latest time point among time points when the operation is to be ended, with respect to each of a plurality of power-consuming bodies that generate power demand; a necessary operation time setting unit that sets a necessary operation time which is a length of time for performing the operation and which is equal to or shorter than a time from the operation startable time point to the operation end target time point, with respect to each of the plurality of power-consuming bodies; a shape information obtaining unit that obtains shape information indicating an assumed shape of a transition line indicating transition in the amount of power supplied in a target period; and a demand transition setting unit that determines power demand transition information indicating transition in electrical energy demand in the target period so that the necessary operation time is obtained and the transition in the electrical energy demand generated by the plurality of power-consuming bodies being operated follows the assumed shape.

According to another aspect of the invention, there is provided a power-consuming body that receives the operation schedule from the above-described information processing apparatus, and is operated according to the operation schedule.

According to still another aspect of the invention, there is provided an information processing method including: setting an operation startable time point when an operation is startable, and an operation end target time point which is a latest time point among time points when the operation is to be ended, with respect to each of a plurality of power-consuming bodies that generate power demand; setting a necessary operation time which is a length of time for performing the operation and which is equal to or shorter than a time from the operation startable time point to the operation end target time point, with respect to each of the plurality of power-consuming bodies; obtaining shape information indicating an assumed shape of a transition line indicating transition in the amount of power supplied in a target period, by a computer; and determining power demand transition information indicating transition in electrical energy demand in the target period so that the necessary operation time is obtained and the transition in the electrical energy demand generated by the plurality of power-consuming bodies being operated follows the assumed shape, by the computer.

According to still another aspect of the invention, there is provided a program causing a computer to realize functions including: a function of setting an operation startable time point when an operation is startable, and an operation end target time point which is a latest time point among time points when the operation is to be ended, with respect to each of a plurality of power-consuming bodies that generate power demand; a function of setting a necessary operation time which is a length of time for performing the operation and which is equal to or shorter than a time from the operation startable time point to the operation end target time point, with respect to each of the plurality of power-consuming bodies; a function of obtaining shape information indicating an assumed shape of a transition line indicating transition in the amount of power supplied in a target period, by a computer; and a function of determining power demand transition information indicating transition in electrical energy demand in the target period so that the necessary operation time is obtained and the transition in the electrical energy demand generated by the plurality of power-consuming bodies being operated follows the assumed shape, by the computer.

According to the invention, it is possible to support setting of an appropriate demand schedule.

BRIEF DESCRIPTION OF THE DRAWINGS

The above objects and other objects, features and advantages will become more apparent by preferred embodiments to be described below and the accompanying drawings.

FIG. 11 is a diagram illustrating a second example of details of steps S40 and S50 in FIG. 5.

DESCRIPTION OF EMBODIMENTS

Figure 1:
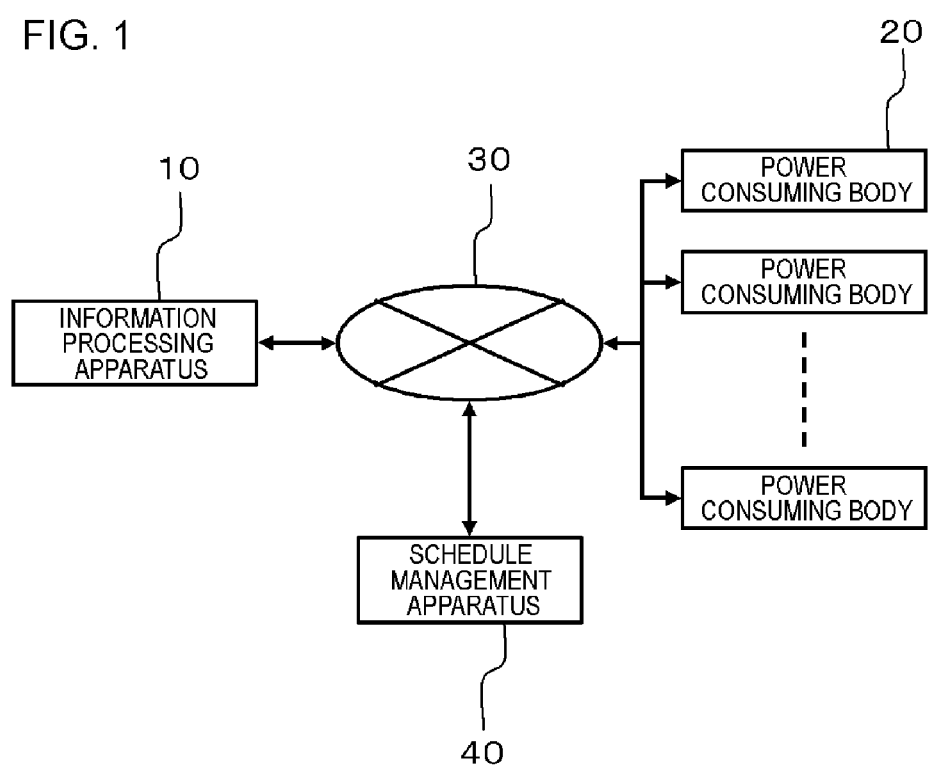
FIG. 1 is a diagram illustrating a usage environment of an information processing apparatus according to a first embodiment.

Hereinafter, embodiments of the invention will be described with reference to the accompanying drawings. In all drawings, the same reference numerals are given to the same components, and description thereof will not be repeated.

In the following description, each component of each apparatus does not represent a hardware unit configuration but represents a functional unit block. Each component of each apparatus is realized by an arbitrary combination of hardware and software on the basis of a CPU of an arbitrary computer, a memory, a program that is loaded in the memory and realizes the components shown in the drawings, a storage media such as a hard disk that stores the program, and a network connection interface. Further, the realization method and apparatus have various modification examples.

First Embodiment

FIG. 1 is a diagram illustrating a usage environment of an information processing apparatus 10 according to a first embodiment. The information processing apparatus 10 performs communication between plural power-consuming bodies 20 and a schedule management apparatus 40 through a communication network 30.

The power-consuming body 20 causes power demand, and is an electric device or a charger, for example. More specifically, the power-consuming body 20 is at least one of a charging station of an electric vehicle, a heat pump that changes electrical energy to thermal energy for storage, a portable communication terminal, a computer requiring an amount of charging, an electric assisted bicycle, and a robot requiring an amount of charging. The heat pump includes a case where the heat pump is used as an air conditioner in an indoor space.

The schedule management apparatus 40 is used when a schedule of transition in electrical energy supplied over time to a power network is generated. The power-consuming bodies 20 are connected to the power network. Further, the information processing apparatus 10 is used when an operation schedule of the power-consuming body 20 is generated. Specifically, the information processing apparatus 10 obtains shape information from the schedule management apparatus 40. The shape information represents an assumed shape of a transition line indicating transition in the amount of power supplied during a target period. Further, the information processing apparatus 10 forms an operation schedule of the power-consuming body 20 to follow the assumed shape.

Figure 2:
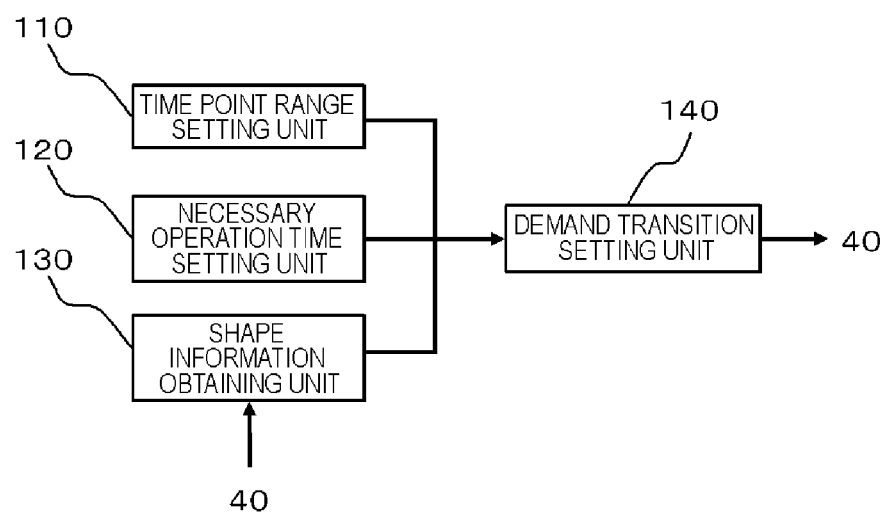
FIG. 2 is a block diagram illustrating a functional configuration of the information processing apparatus.

FIG. 2 is a block diagram illustrating a functional configuration of the information processing apparatus 10. The information processing apparatus 10 includes a time point range setting unit 110, a necessary operation time setting unit 120, a shape information obtaining unit 130, and a demand transition setting unit 140. The time point range setting unit 110 sets an operation startable time point when the operation is startable, and an operation end target time point which is the latest time point among time points when the operation is to be ended, with respect to each of the plural power-consuming bodies 20. The necessary operation time setting unit 120 sets a necessary operation time with respect to each of the plural power-consuming bodies 20. The necessary operation time corresponds to the length of a time when the operation is to be performed by the power-consuming bodies 20, which has a length equal to or shorter than a time from the operation startable time point to the operation end target time point. The shape information obtaining unit 130 obtains the shape information from the schedule management apparatus 40. Further, the demand transition setting unit 140 determines power demand transition information indicating the transition in electrical energy demand during the target period so that the necessary operation time is obtained and the transition in the electrical energy demand generated by the plural power-consuming bodies 20 being operated follows the assumed shape. The target period corresponds to a partial time period that is a part of one day, for example. The partial time period corresponds to a time period when the power demand is concentrated, which is a time period when power generation based on renewable energy is efficiently performed, for example.

The information processing apparatus 10 determines the power demand transition information such that it follows the shape information indicating the assumed shape of the transition line indicating the transition in the amount of power supplied. Accordingly, it is possible to easily determine power demand transition information with a stable balance between supply and demand.

Second Embodiment

Figure 3:
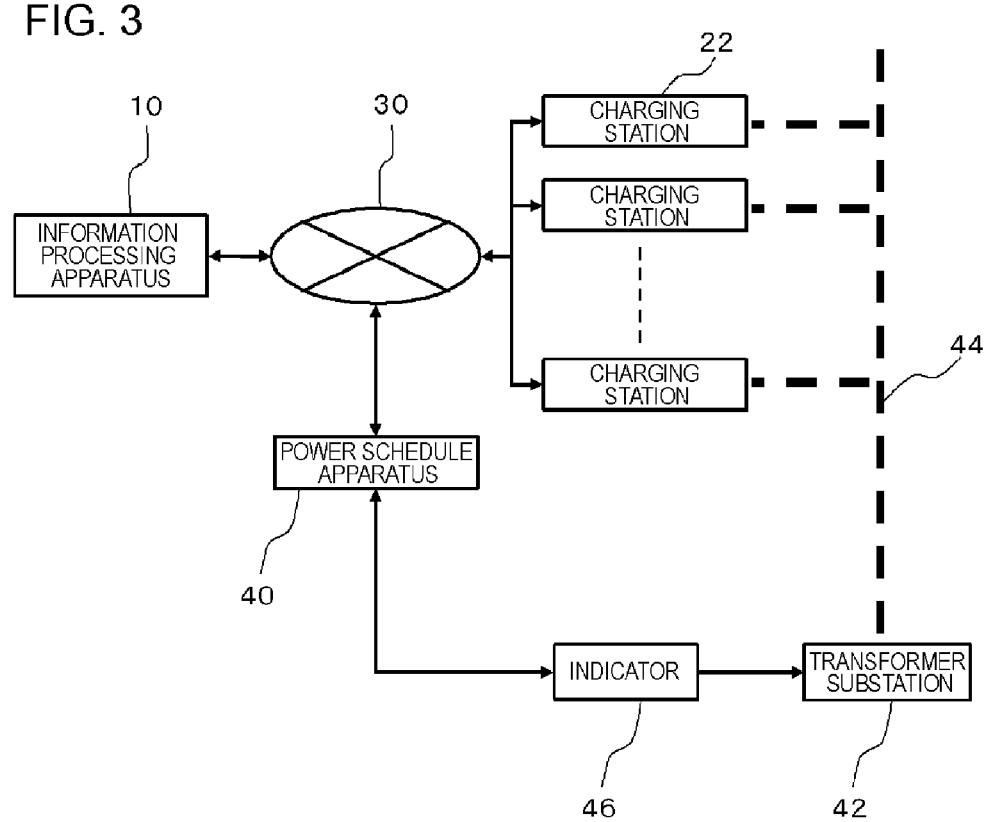
FIG. 3 is a diagram illustrating a usage environment of an information processing apparatus according to a second embodiment.

FIG. 3 is a diagram illustrating a usage environment of an information processing apparatus 10 according to a second embodiment. The information processing apparatus 10 according to the present embodiment is connected to plural charging stations 22 and the schedule management apparatus 40 through the communication network 30. The plural charging stations 22 have a charger, which is a charging station of an electric vehicle, for example. The charging station 22 is an example of the power-consuming body 20 according to the first embodiment. The charging station 22 is connected to a power network 44. Power supplied to the power network 44 is controlled by a transformer substation 42. The transformer substation 42 controls the power supplied to the power network 44 according to an instruction transmitted from an indicator 46. An operation schedule of the indicator 46 is stored by the schedule management apparatus 40. Shape information transmitted to the information processing apparatus 10 is determined based on the operation schedule of the indicator 46.

In the example shown in FIG. 3, the information processing apparatus 10 and the schedule management apparatus 40 are connected to each other through the communication network 30, but the information processing apparatus 10 and the schedule management apparatus 40 may be connected to each other through an exclusive line. Further, the information processing apparatus 10 and the schedule management apparatus 40 may be configured by a single computer.

Figure 4:
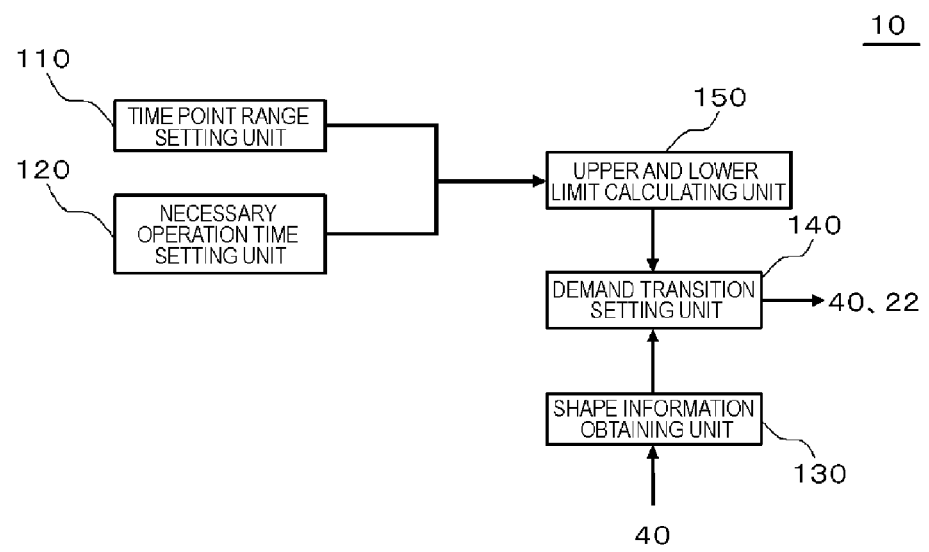
FIG. 4 is a block diagram illustrating a functional configuration of the information processing apparatus according to the second embodiment.

FIG. 4 is a block diagram illustrating a functional configuration of the information processing apparatus 10 according to the present embodiment. The information processing apparatus 10 has the same configuration as that of the information processing apparatus 10 according to the first embodiment, except for the following points.

First, the information processing apparatus 10 includes an upper and lower limit calculating unit 150. The upper and lower limit calculating unit 150 calculates a maximum electrical energy demand and a minimum electrical energy demand using a necessary operation time, an operation startable time point, and an operation end target time point. The maximum electrical energy demand refers to electrical energy demand within a target period when a time period included in the target period, in a time period when the charging station 22 is operated, is set to be the longest for each of the plural charging stations 22. On the other hand, the minimum electrical energy demand refers to electrical energy demand within the target period when the time period included in the target period, in the time period when the charging station 22 is operated, is set to be the shortest for each of the plural charging stations 22. In other words, the maximum electrical energy demand refers to electrical energy demand when the operation time (that is, charging timing of the electric vehicle) of the charging station 22 is included in the target period as much as possible, in all of the charging stations 22. Further, the minimum electrical energy demand refers to electrical energy demand when the operation time (that is, charging timing of the electric vehicle) of the charging station 22 is not included in the target period as much as possible, in all of the charging stations 22.

Further, the demand transition setting unit 140 determines first power demand transition information so that the maximum electrical energy demand is obtained within the target period, and determines second power demand transition information so that the minimum electrical energy demand is obtained within the target period. The calculated first power demand transition information and second power demand transition information are transmitted to the schedule management apparatus 40.

The first power demand transition information is based on a maximum value of electrical energy capable of being accumulated by the plural charging stations 22 within the target period, and the second power demand transition information is based on electrical energy that should be accumulated by the plural charging stations 22 within the target period. Thus, the power supply schedule for the power network 44 becomes a realistic schedule as long as it is included in a region between the first power demand transition information and the second power demand transition information.

Further, the information processing apparatus 10 calculates operation schedules of the plural charging stations 22 when calculating the first power demand transition information and the second power demand transition information. The demand transition setting unit 140 of the information processing apparatus 10 transmits the operation schedules to the plural charging stations 22.

The charging station 22 is operated according to the received operation schedule.

Figure 5:
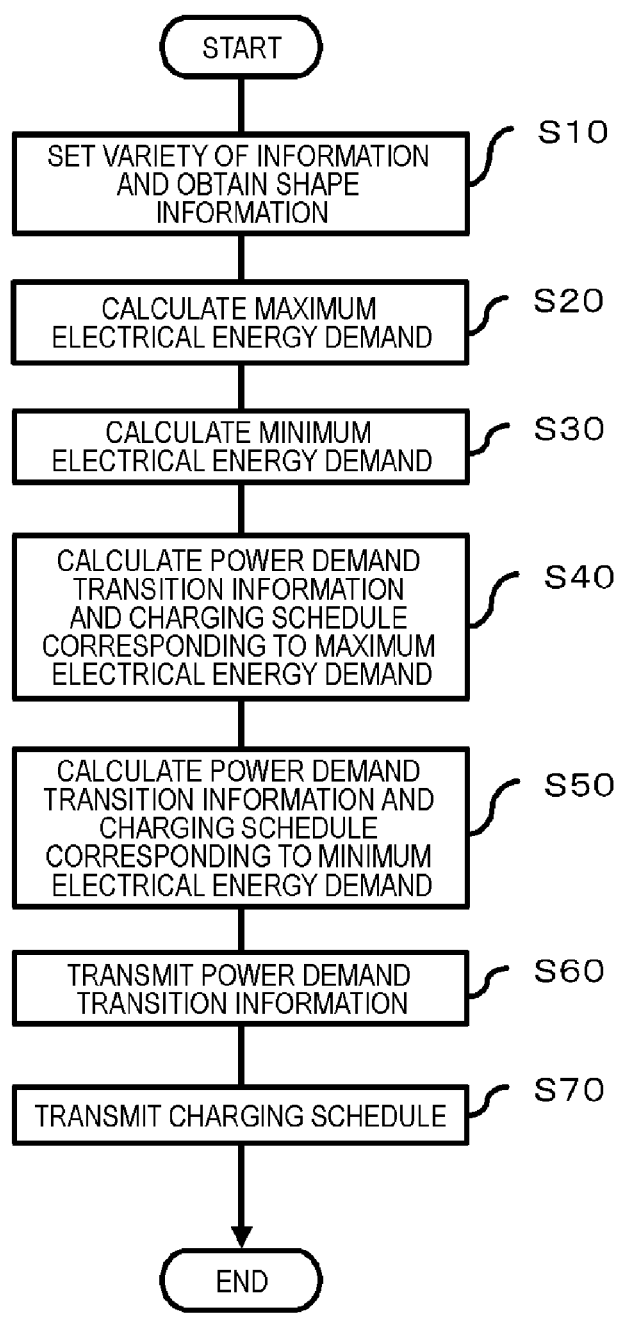
FIG. 5 is a flowchart illustrating an operation of the information processing apparatus according to the second embodiment.

FIG. 5 is a flowchart illustrating an operation of the information processing apparatus 10 according to the present embodiment. First, the time point range setting unit 110 of the information processing apparatus 10 sets an operation startable time point and an operation end target time point of each of the plural charging stations 22. Further, the necessary operation time setting unit 120 sets a necessary operation time of each of the plural charging stations 22. In addition, the shape information obtaining unit 130 obtains shape information from the schedule management apparatus 40 (step S10).

Specifically, the operation startable time point, the operation end target time point, and the necessary operation time are calculated based on an operation history of each of the charging stations 22, for example. The operation history at least includes a time point when a rechargeable battery is connected to a charger (plug-in time point), a time point when the rechargeable battery is separated from the charger (plug-out time point), and a free capacity up to full charge at a charging start time. The operation startable time point is an average time point of the plug-in time points, for example, and the operation end target time point is an average time point of the plug-out time points, for example. Further, the necessary operation time is determined based on the free capacity. The calculation process of the operation startable time point, the operation end target time point, and the necessary operation time may be performed by the charging station 22, or may be performed by the information processing apparatus 10. In the latter case, the charging station 22 transmits data indicating the operation history to the information processing apparatus 10. The information processing apparatus 10 stores the received data.

Then, the upper and lower limit calculating unit 150 calculates the maximum electrical energy demand (step S20), and calculates the minimum electrical energy demand (step S30). The demand transition setting unit 140 determines the first power demand transition information so that the maximum electrical energy demand can be obtained within the target period. Accordingly, the demand transition setting unit 140 calculates a first charging schedule of each of the plural charging stations 22 (step S40). Further, the demand transition setting unit 140 determines the second power demand transition information so that the minimum electrical energy demand can be obtained within the target period. Accordingly, the demand transition setting unit 140 calculates a second charging schedule of each of the plural charging stations 22 (step S50). Details of the processes from step S20 to step S50 will be described later.

Further, the demand transition setting unit 140 transmits the first power demand transition information and the second power demand transition information to the schedule management apparatus 40 (step S60). Further, the demand transition setting unit 140 transmits the first charging schedule and the second charging schedule of the charging station 22 to each of the plural charging stations 22 (step S70).

Figure 6:
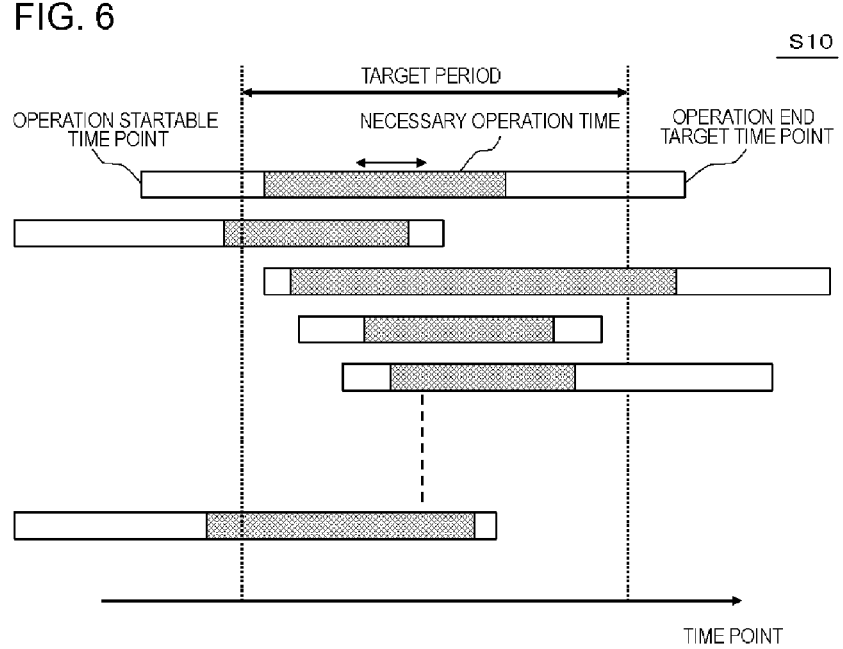
FIG. 6 is a diagram illustrating an example of the relationship among an operation startable time point, an operation end target time point, a necessary operation time, and a target period.

FIG. 6 shows an example of the relationship among the operation startable time point, the operation end target time point, the necessary operation time, and the target period. The information processing apparatus 10 obtains these pieces of information in step S10 in FIG. 5.

Generally, the necessary operation time is longer than a time from the operation startable time point to the operation end target time point. Thus, a time period when the charger of the charging station 22 is operated may be freely moved to a certain degree between the operation startable time point and the operation end target time point. Further, the time period may be divided into plural regions, and the charger of the charging station 22 may be operated in a part thereof.

Figure 7:
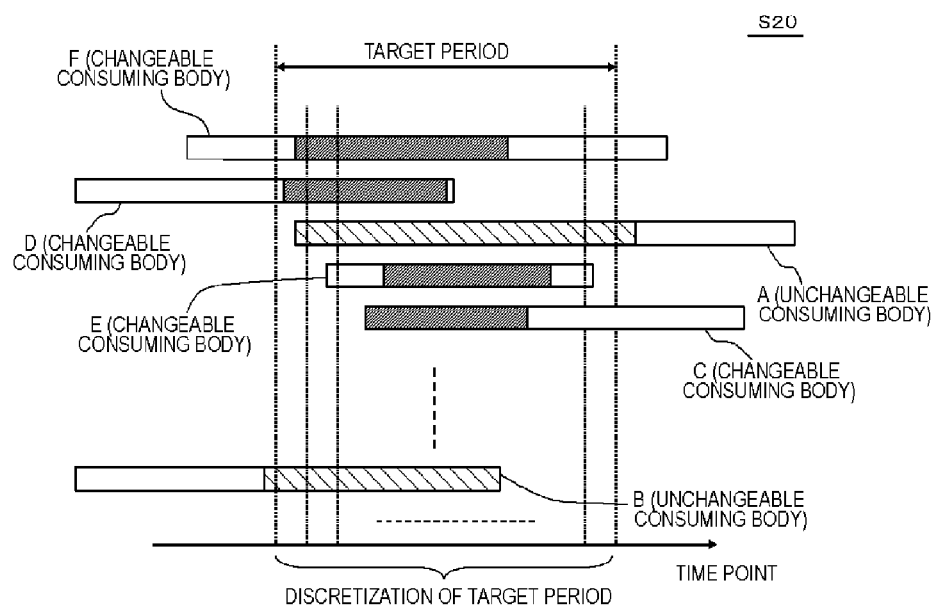
FIG. 7 is a diagram illustrating a calculation process (step S20 in FIG. 5) of a maximum electrical energy demand.

FIG. 7 is a diagram illustrating the calculation process (step S20 in FIG. 5) of the maximum electrical energy demand. As described above, the time period when the charger of the charging station 22 is operated may be freely moved to a certain degree between the operation startable time point and the operation end target time point. Further, the time period may be divided into plural regions, and the charger of the charging station 22 may be operated in a part thereof. The demand transition setting unit 140 sets the time period when the charger of the charging station 22 is operated so that the time period when the charger of the charging station 22 is operated is included in the target period as much as possible. The setting may be performed so that a specific time period is divided into plural regions and a part thereof is used as a time period when the charger of the charging station 22 is operated.

Further, for example, when the operation startable time point is present in the target period, the operation end target time point is present outside the target period, and the time from the operation startable time point to the end time point of the target period is shorter than the necessary charging time, the demand transition setting unit 140 sets a time point when the operation of the charger of the charging station 22 is started as the operation startable time point (example A in FIG. 7). In this case, the operation end time point of the charger of the charging station 22 comes after the target period. Further, the operation schedule of the charging station 22 does not have a degree of freedom, and is uniformly determined (unchangeable consuming body).

Further, when the operation startable time point is present outside the target period, the operation end target time point is present in the target period, and the time from the start time point of the target period to the operation end target time point is shorter than the necessary charging time, the demand transition setting unit 140 sets a time point when the operation of the charger of the charging station 22 is ended as the operation end target time point (example B in FIG. 7). In this case, the operation end time point of the charger of the charging station 22 comes after the target period. Further, the operation schedule of the charging station 22 does not have a degree of freedom and is uniformly determined (unchangeable consuming body).

Further, when the operation startable time point is present in the target period, the operation end target time point is present outside the target period, and the time from the operation startable time point to the end time point of the target period is longer than the necessary charging time, the setting of the charging time period in the demand transition setting unit 140 has a degree of freedom (example C in FIG. 7). That is, the operation schedule of the charging station 22 has a degree of freedom (changeable consuming body). The degree of freedom is between when the start time point of the operation of the charger of the charging station 22 becomes the operation startable time point (that is, when the charging time is shifted to the leftmost side in the figure) and when the end time point of the operation of the charger of the charging station 22 becomes the end time point of the target period.

Further, when the operation startable time point is present outside the target period, the operation end target time point is present in the target period, and the time from the start time point of the target period to the operation end target time point is longer than the necessary charging time, the setting of the charging time period in the demand transition setting unit 140 has a degree of freedom (example D in FIG. 7). That is, the operation schedule of the charging station 22 has a degree of freedom (changeable consuming body). The degree of freedom is between when the start time point of the operation of the charger of the charging station 22 becomes the start time point of the target period and when the end time point of the operation of the charger of the charging station 22 becomes the operation end target time point (that is, when the charging time is shifted to the rightmost side in the figure).

In addition, when both of the operation startable time point and the operation end target time point are present in the target period, and the necessary operation time is shorter than the time from the operation startable time point to the operation end target time point, the setting of the charging time period in the demand transition setting unit 140 has a degree of freedom (example E in FIG. 7). That is, the operation schedule of the charging station 22 has a degree of freedom (changeable consuming body). The degree of freedom is between when the start time point of the operation of the charger of the charging station 22 becomes the operation startable time point (that is, when the charging time is shifted to the leftmost side in the figure) and when the end time point of the operation of the charger of the charging station 22 becomes the operation end target time point (that is, when the charging time is shifted to the rightmost side in the figure).

Furthermore, when both of the operation startable time point and the operation end target time point are present outside the target period, and the necessary operation time is shorter than the target period, the setting of the charging time period in the demand transition setting unit 140 has a degree of freedom (example F in FIG. 7). That is, the operation schedule of the charging station 22 has a degree of freedom (changeable consuming body). The degree of freedom is between when the start time point of the operation of the charger of the charging station 22 becomes the start time point of the target period and when the end time point of the operation of the charger of the charging station 22 becomes the end time point of the target period (that is, when the charging time is shifted to the rightmost side in the figure).

Further, the demand transition setting unit 140 controls the operation schedule of the charging station 22 that is the changeable consuming body in the calculation process (step S40) of the first power demand transition information. Here, the demand transition setting unit 140 divides the target period into specific time units (discretization). The time unit is sufficiently small with respect to a time necessary for ON/OFF switching of the charger of the charging station 22. Step S40 will be described later.

Figure 8:
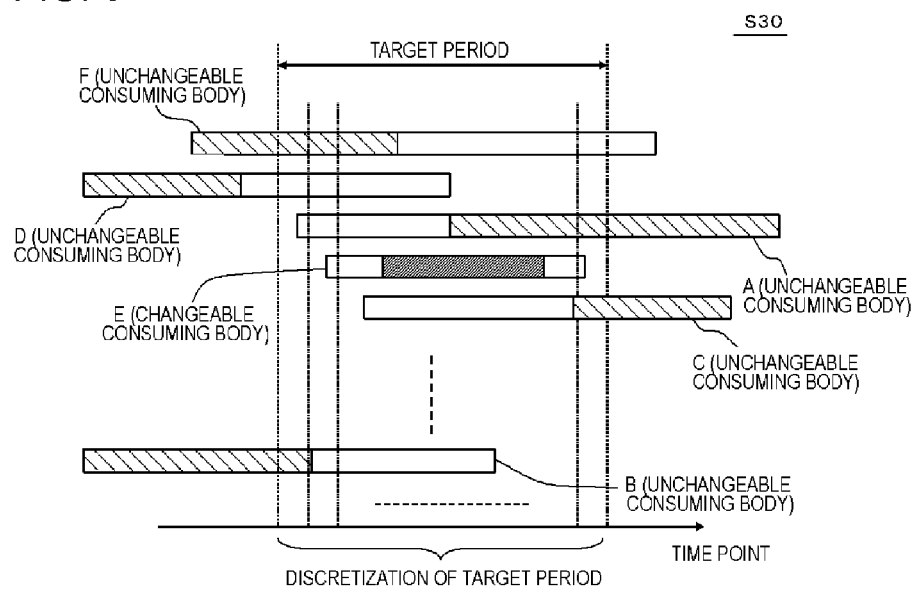
FIG. 8 is a diagram illustrating a calculation process (step S30 in FIG. 5) of a minimum electrical energy demand.

FIG. 8 is a diagram illustrating the calculation process (step S30 in FIG. 5) of the minimum electrical energy demand. As described above, the time period when the charger of the charging station 22 is operated may be freely moved to a certain degree between the operation startable time point and the operation end target time point. The demand transition setting unit 140 sets the time period when the charger of the charging station 22 is operated so that the time period when the charger of the charging station 22 is operated is not included in the target period as much as possible.

For example, when the operation startable time point is present outside the target period, the demand transition setting unit 140 sets a time point when the operation of the charger of the charging station 22 is started as the operation startable time point (examples B, D, and F in FIG. 7). In this case, the operation schedule of the charging station 22 does not have a degree of freedom, and is uniformly determined (unchangeable consuming body).

Further, when the operation end target time point is present outside the target period, the demand transition setting unit 140 sets a time point when the operation of the charger of the charging station 22 is ended as the operation end target time point (examples A and C in FIG. 7). In this case, similarly, the operation schedule of the charging station 22 does not have a degree of freedom, and is uniformly determined (unchangeable consuming body).

Further, when both of the operation startable time point and the operation end target time point are present in the target period, and the necessary operation time is shorter than the time from the operation startable time point to the operation end target time point, the setting of the charging time period in the demand transition setting unit 140 has a degree of freedom (example E in FIG. 7). That is, the operation schedule of the charging station 22 has a degree of freedom (changeable consuming body). The degree of freedom is between when the start time point of the operation of the charger of the charging station 22 becomes the operation startable time point (that is, when the charging time is shifted to the leftmost side in the figure) and when the end time point of the operation of the charger of the charging station 22 becomes the operation end target time point (that is, when the charging time is shifted to the rightmost side in the figure).

In addition, the demand transition setting unit 140 controls the operation schedule of the charging station 22 that is the changeable consuming body in the calculation process (step S50) of the second power demand transition information. Here, the demand transition setting unit 140 divides the target period into specific time units (discretization). Step S50 will be described later. The time unit is sufficiently small with respect to a time necessary for ON/OFF switching of the charger of the charging station 22.

Figure 9:
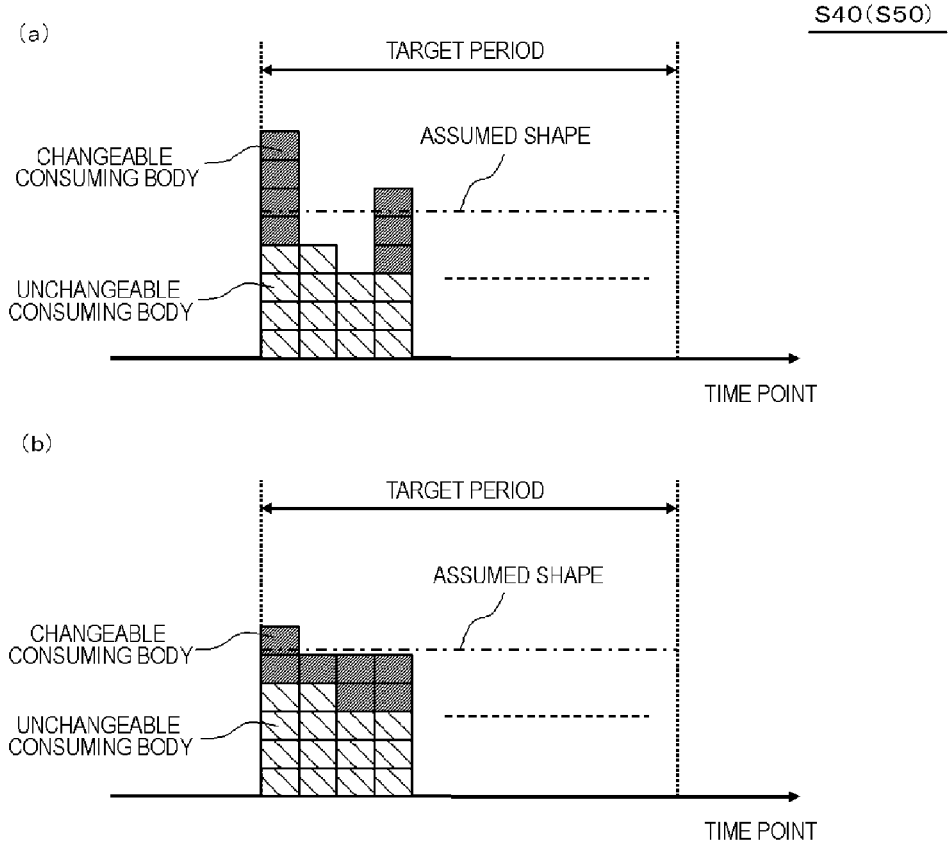
FIG. 9 is a diagram illustrating a first example of details of steps S40 and S50 in FIG. 5.

FIG. 9 is a diagram illustrating a first detailed example of steps S40 and S50 in FIG. 5. The example shown in the figure shows a case where a transition line is a straight line (that is, when the amount of power supplied is uniform on a time axis). As described above, the demand transition setting unit 140 divides the target period into specific time units $\Delta t$. Further, the demand transition setting unit 140 moves the charging time period of the changeable consuming body. Thus, as shown in FIG. 9(b), the power demand in the changeable consuming body shifts on the time axis. The demand transition setting unit 140 repeats this operation so that the power demand becomes close to a desired value. Further, as a result of this process, the operation schedules of all the charging stations 22 are set.

The process based on FIG. 9 is performed with respect to each of the maximum electrical energy demand and the minimum electrical energy demand. As a result, the first power demand transition information and the second power demand transition information are calculated.

Figure 10:
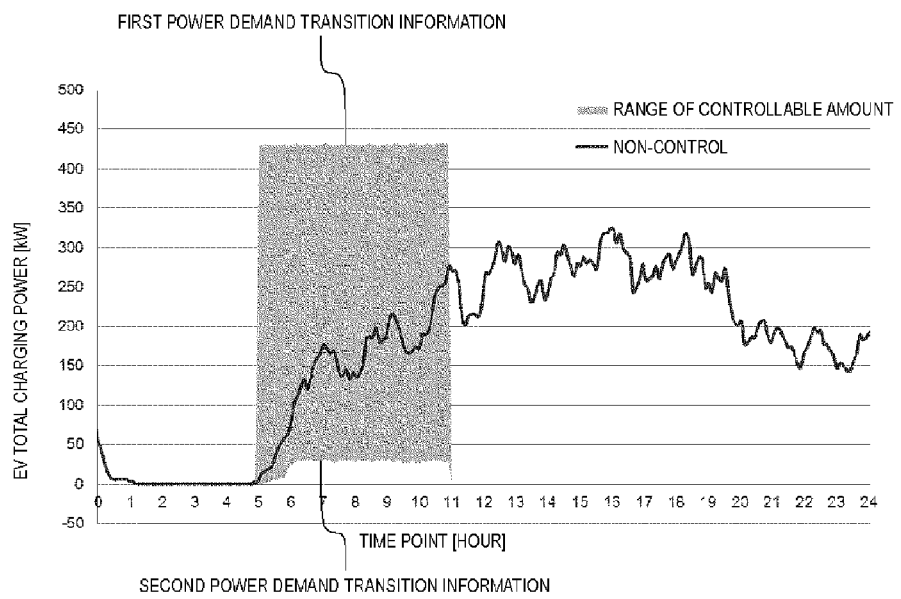
FIG. 10 is a diagram illustrating a result of a process shown in FIG. 9.

FIG. 10 is a diagram illustrating a result of the process shown in FIG. 9. The power demand schedule in the power network 44 is set to be included in a region between the first power demand transition information and the second power transition information.

FIGS. 11 to 14 are diagrams illustrating a second detailed example of steps S40 and S50 in FIG. 5. The example shown in the figures shows a case where an assumed shape (transition line) is a curved line, as shown in FIG. 11(a), and is indicated by a function (first function). First, as shown in FIG. 11(b), the demand transition setting unit 140 divides the assumed shape in the time unit $\Delta t$ using the first function, for discretization.

Figure 12:
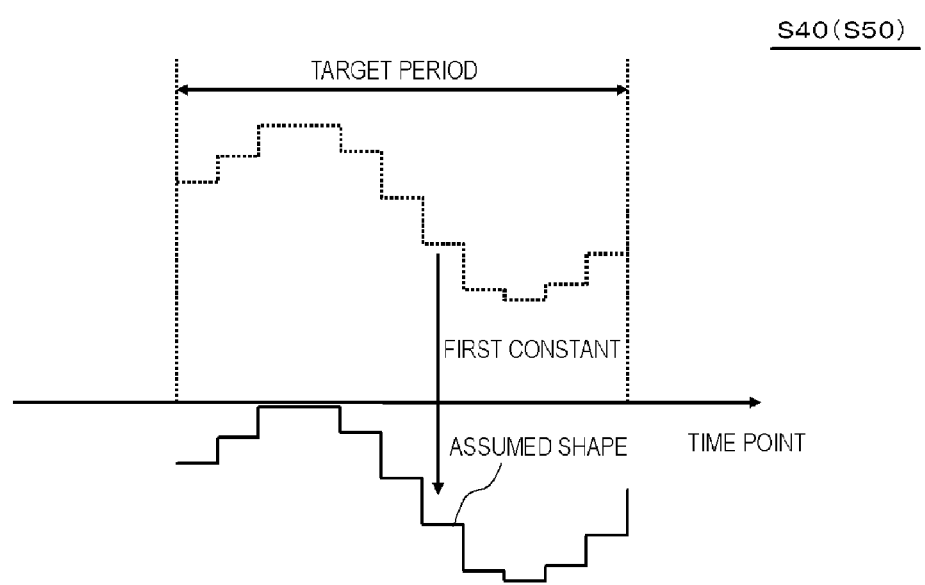
FIG. 12 is a diagram illustrating the second example of details of steps S40 and S50 in FIG. 5.

Then, as shown in FIG. 12, the demand transition setting unit 140 adds a negative first constant to the discretized first function. Here, the demand transition setting unit 140 determines the first constant so that the first function is smaller than 0 over the entire target period. Specifically, the first constant is a value obtained by multiplying a maximum value of the first function in the target period by −1, or a value larger than the former value in a negative direction.

Figure 13:
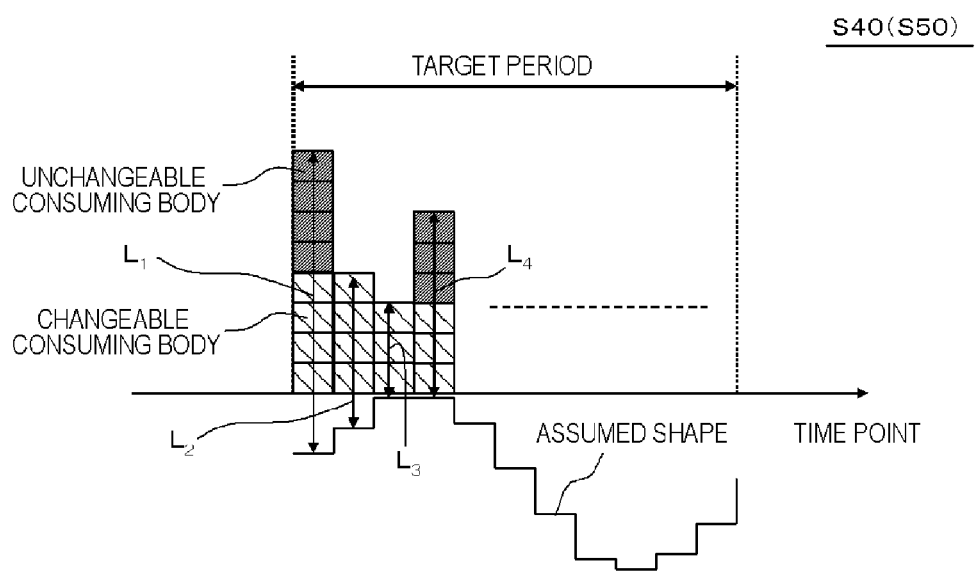
FIG. 13 is a diagram illustrating the second example of details of steps S40 and S50 in FIG. 5.
Figure 14:
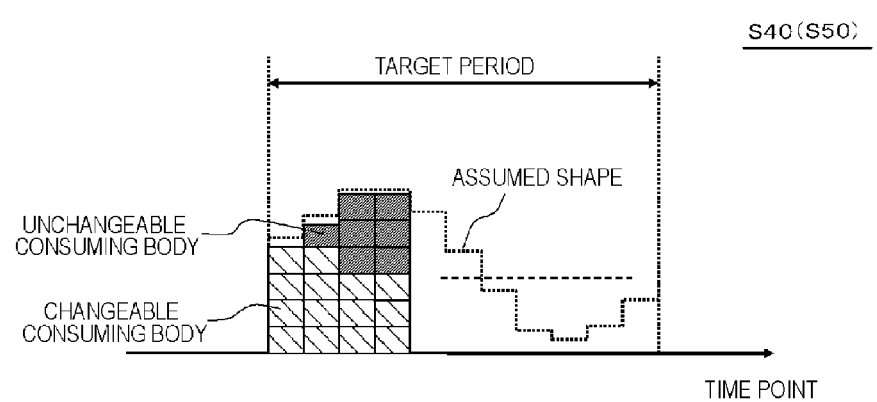
FIG. 14 is a diagram illustrating the second example of details of steps S40 and S50 in FIG. 5.

Then, as shown in FIGS. 13 and 14, the demand transition setting unit 140 determines the power demand transition information so that the sum of the squares of differences between the first function and the power demand transition information becomes minimum. Specifically, the demand transition setting unit 140 calculates a difference $L_t$ between the first function indicating the assumed shape and the power demand transition information in each discretized section. Then, the demand transition setting unit 140 determines the power demand transition information so that the sum of the squares of the differences $L_t$ becomes a minimum value. This process is expressed as a formula as follows.

$$\min: \Sigma(W(t)-f'(t))^2$$

Here, W(t) represents the power demand transition information, which is a discretized function (second function), and f'(t) represents the first function after addition of the first constant. Further, (W(t)−f'(t)) becomes $L_t$.

Figure 15:
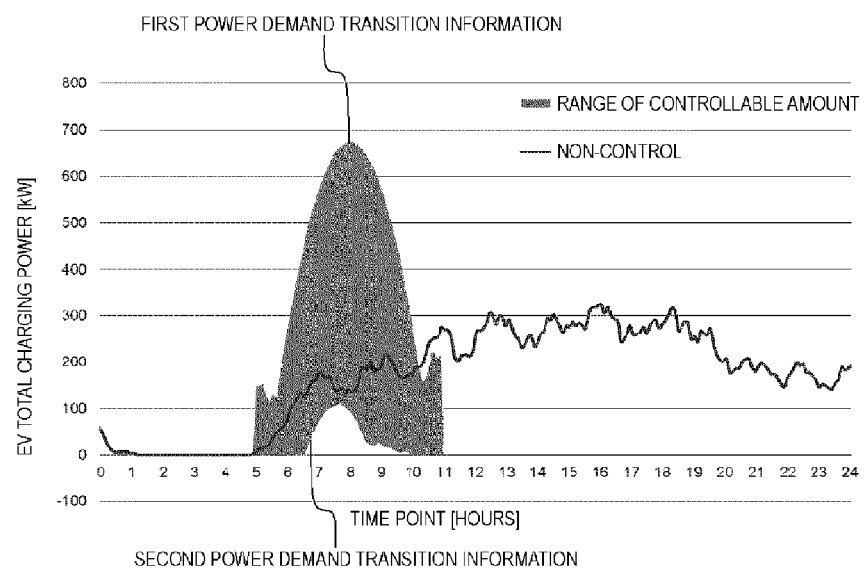
FIG. 15 is a diagram illustrating a result of a process shown in FIGS. 11 to 14.

FIG. 15 is a diagram illustrating a result of the process shown in FIGS. 11 to 14. In the figure, the power supply schedule for the power network 44 is set to be included in the region between the first power demand transition information and the second power transition information.

According to the present embodiment described above, the same effects as those of the first embodiment can be obtained. Further, the first power demand transition information is based on the maximum value of electrical energy capable of being accumulated by the plural charging stations 22 within the target period, and the second power demand transition information is based on electrical energy that should be accumulated by the plural charging stations 22 within the target period. Thus, the power supply schedule for the power network 44 becomes a realistic schedule as long as it is included in the region between the first power demand transition information and the second power transition information.

Further, the demand transition setting unit 140 determines the first constant so that the first function is smaller than 0 over the entire target period. Thus, in the process shown in FIGS. 13 and 14, there is only one amount of power demand having a certain value $L_t$. Accordingly, a calculation amount of the process shown in FIGS. 13 and 14 decreases.

Figure 16:
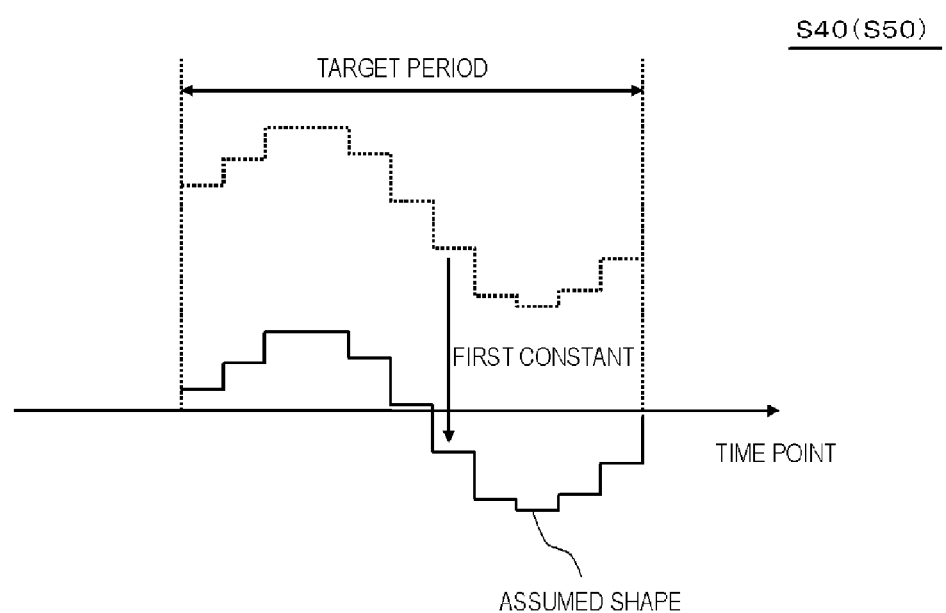
FIG. 16 is a diagram illustrating a modification example of a process shown in FIG. 12.

The first constant shown in FIG. 12 may not have a value where the entirety of the first function becomes negative. For example, as shown in FIG. 16, the first constant may be a value where the first function becomes negative in a certain section. In this case, similarly, the calculation amount of the process shown in FIGS. 13 and 14 decreases.

Further, the operation startable time point, the operation end target time point, and the necessary operation time may be calculated using day-of-the-week information, month information, humidity, battery temperature, and information of the rechargeable battery type (for example, vehicle type information) in addition to the operation history of each of the charging stations 22.

Third Embodiment

Figure 17:
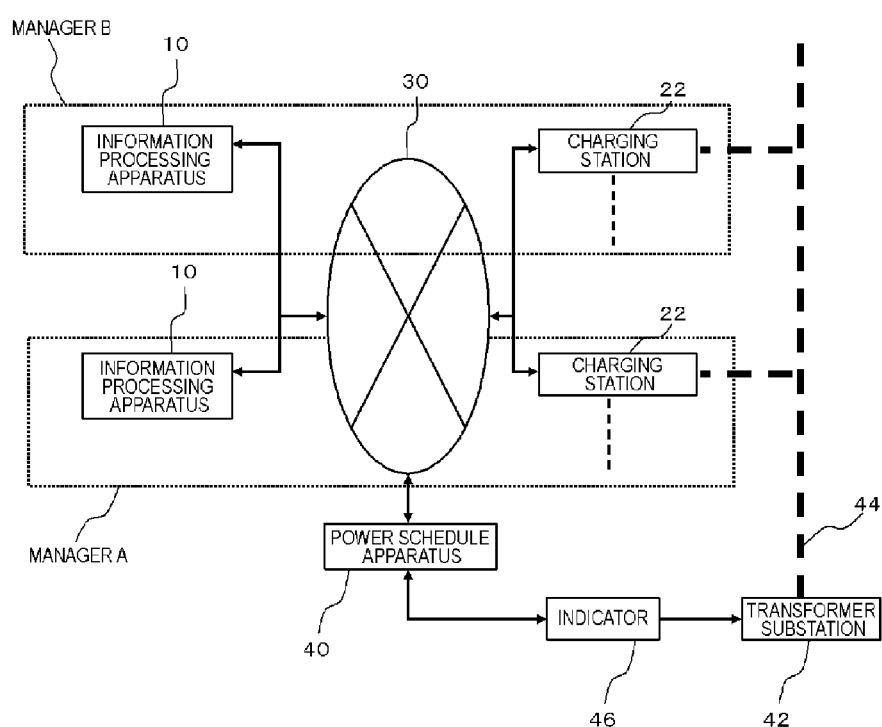
FIG. 17 is a diagram illustrating a usage environment of an information processing apparatus according to a third embodiment.

FIG. 17 is a diagram illustrating a usage environment of an information processing apparatus 10 according to a third embodiment. The usage environment of the third embodiment is the same as that of the information processing apparatus 10 according to the second embodiment except for the following points.

First, plural information processing apparatuses 10 are provided with respect to one schedule management apparatus 40. The plural information processing apparatuses 10 are managed by different managers. Further, the plural information processing apparatuses 10 manage different charging stations 22. The charging stations 22 are all connected to the same power network 44.

Further, it is necessary to match the electrical energy transmitted to one power network 44 with the total sum of the electrical energy demand of the plural charging stations 22 managed by the plural information processing apparatuses 10.

Figure 18:
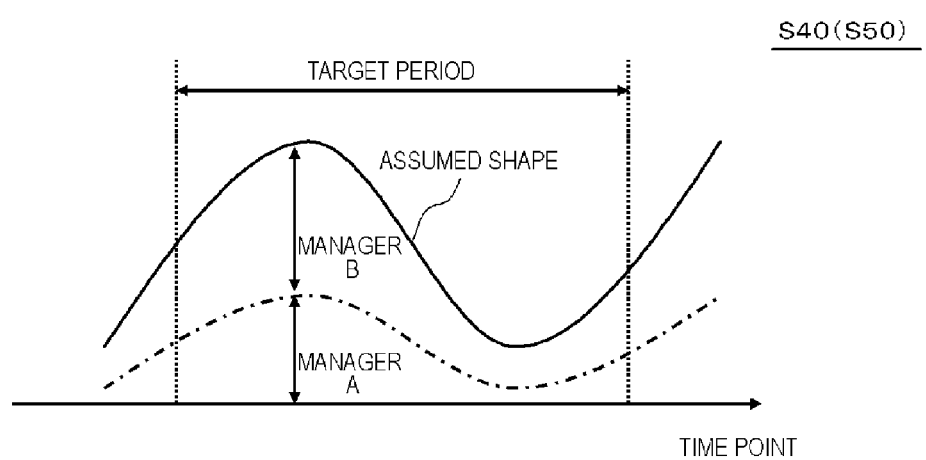
FIG. 18 is a diagram illustrating an operation of the information processing apparatus according to the third embodiment.

FIG. 18 is a diagram illustrating an operation of the information processing apparatus 10 according to the present embodiment. The information processing apparatus 10 according to the present embodiment performs the same process as that of the information processing apparatus 10 according to the second embodiment in that the demand transition setting unit 140 performs the following processes.

First, the demand transition setting unit 140 calculates first power demand transition information and second power transition information so that transition in the electrical energy demand follows a function obtained by multiplying the first function which is shape information by a second constant. Here, the demand transition setting unit 140 determines the power demand transition information so that the sum of absolute values of differences between the first function and the power demand transition information in a state where a linear function of which a coefficient is negative is added to the first function after multiplication of the second constant becomes minimum. The second constant is a constant smaller than 1.

Specifically, the processes are performed as follows. First, when the first function in a state obtained from the schedule management apparatus 40 is represented as f(t), the second constant is represented as b, and the above-mentioned linear function is represented as at, a corrected first function f'(t, b) is defined as follows.

$$f'(t,b)=bf(t)-at$$

Here, f(t)≥0

Further, b and $W_t$ are set so that the following value becomes minimum.

$$\min: \Sigma(W_t-f'(t,b))^2$$

Here, $W_t$ represents a discretized function (second function) indicating power demand transition information. Further, ($W_t$−f'(t, b)) corresponds to $L_t$ shown in FIG. 13.

That is, in the present embodiment, the power transition information that is calculated by each of the plural information processing apparatuses 10 by the second constant b becomes a shape fitted to the assumed shape. Thus, if the power transition information of each of the plural information processing apparatuses 10 is added, a shape following the first function, that is, the assumed shape is formed.

According to the present embodiment, similarly, the same effects as those of the second embodiment can be obtained. Further, even if a change different from that predicted occurs in the electrical energy demand managed by a certain information processing apparatus 10, the influence on the entire electrical energy demand is small.

Specifically, when the plural charging stations 22 connected to one power network 44 are managed by the plural managers, it is considered that different time periods are allocated to the respective managers. In this case, when a change different from that predicted occurs in the electrical energy demand managed by a certain information processing apparatus 10, the balance between supply and demand in the time period when the information processing apparatus 10 is allocated is disturbed. On the other hand, in the present embodiment, the power transition information is set to follow the function obtained by multiplying the first function indicating the assumed shape by the second constant b smaller than 1. Thus, even if a change different from that predicted occurs in the electrical energy demand, the influence of the change amount on the entire electrical energy demand decreases due to the second constant b.

Hereinbefore, the embodiments of the invention have been described with reference to the accompanying drawings, but the embodiments are only examples of the invention, and various configurations other than the above description may be employed.

This application is based on and claims the priority of Japanese Patent Application No. 2012-213745 filed on Sep. 27, 2012, the entire contents of which are incorporated herein by reference.

What is claimed is:

1. An information processing apparatus comprising:
at least one processor configured to implement:
a time point range setting unit configured to set an operation startable time point when an operation is startable, and an operation end target time point which is a latest time point among time points when the operation is to be ended, with respect to each of a plurality of power-consuming bodies that generate power demand;
a necessary operation time setting unit configured to set a necessary operation time which is a length of time for performing the operation and which is equal to or shorter than a time from the operation startable time point to the operation end target time point, with respect to each of the plurality of power-consuming bodies;
a shape information obtaining unit configured to obtain shape information indicating an assumed shape of a transition line indicating transition in an amount of power supplied in a target period;
a demand transition setting unit configured to determine power demand transition information indicating transition in electrical energy demand in the target period so that the necessary operation time is obtained and the transition in the electrical energy demand generated by the plurality of power-consuming bodies being operated follows the assumed shape; and
an upper and lower limit calculating unit configured to calculate the electrical energy demand within the target period when a time period included in the target period, in a time period when the power-consuming body is operated, is set to be the longest for each of the plurality of power-consuming bodies, as a maximum electrical energy demand, and calculates the electrical energy demand within the target period when the time period included in the target period, in the time period when the power-consuming body is operated, is set to be the shortest for each of the plurality of power-consuming bodies, as a minimum power demand, using the necessary operation time, the operation startable time point, and the operation end target time point,
wherein the time point range setting unit sets the operation startable time point and the operation end target time point of each of the plurality of power-consuming bodies using a operation history of each of the plurality of power-consuming bodies, and
wherein the demand transition setting unit is further configured to determine first power demand transition information so that the maximum electrical energy demand is obtained within the target period, and determine second power demand transition information so that the minimum electrical energy demand is obtained within the target period.

2. The information processing apparatus according to claim 1,
wherein the shape information is a first function indicating the transition line, and
the demand transition setting unit is further configured to determine the power demand transition information so that the sum of squares of differences between the first function and the power demand transition information in a state where a negative first constant is added to the first function becomes minimum.

3. The information processing apparatus according to claim 2,
wherein the demand transition setting unit is further configured to determine the first constant so that the first function is smaller than 0 over the entire target period.

4. The information processing apparatus according to claim 1,
wherein the shape information is a first function indicating the transition line, and
the demand transition setting unit is further configured to determine the power demand transition information so that the transition in the electrical energy demand follows a function obtained by multiplying the first function by a second constant.

5. The information processing apparatus according to claim 4,
wherein the demand transition setting unit is further configured to determine the power demand transition information so that the sum of absolute values of differences between the first function and the power demand transition information in a state where a linear function of which a coefficient is negative is added to the first function becomes minimum.

6. The information processing apparatus according to claim 5,
wherein the demand transition setting unit is further configured to calculate the sum of squares of the differences between the first function and the power demand transition information while changing the second constant, and determines the second constant so that the sum becomes minimum.

7. The information processing apparatus according to claim 1,
wherein the power-consuming body is a rechargeable battery, and the operation is a charging operation of the rechargeable battery.

8. The information processing apparatus according to claim 7,
wherein the rechargeable battery is mounted on an electric vehicle of a plurality of electric vehicles,
the time point range setting unit is further configured to set the operation startable time point and the operation end target time point of each of the plurality of electric vehicles using a traveling history of each of the plurality of electric vehicles, and
the necessary operation time setting unit is further configured to set the necessary operation time of each of the plurality of electric vehicles using a charging history of each of the plurality of electric vehicles.

9. The information processing apparatus according to claim 1,
wherein the demand transition setting unit is further configured to set an operation schedule of each of the plurality of power-consuming bodies when determining the power demand transition information, and transmit the operation schedule to each of the plurality of power-consuming bodies.

10. The information processing apparatus according to claim 1, wherein the operation history of the power-consuming body includes at least one among a time point when a rechargeable battery is connected to the power-consuming body, a time point when the rechargeable battery is separated from the power-consuming body, and a free capacity of the rechargeable battery up to full charge at a charging start time.

11. The information processing apparatus according to claim 10, wherein the time point range setting unit is further configured to set the operation startable time point and the operation end target time point of each of the plurality of power-consuming bodies further using at least one of day-of-the-week information, month information, humidity, battery temperature, and information of a rechargeable battery type.

12. A power-consuming body that receives the operation schedule from the information processing apparatus according to claim 9, and is operated according to the operation schedule.

13. An information processing method comprising:
setting an operation startable time point when an operation is startable, and an operation end target time point which is a latest time point among time points when the operation is to be ended, with respect to each of a plurality of power-consuming bodies that generate power demand;
setting a necessary operation time which is a length of time for performing the operation and which is equal to or shorter than a time from the operation startable time point to the operation end target time point, with respect to each of the plurality of power-consuming bodies;
obtaining shape information indicating an assumed shape of a transition line indicating transition in an amount of power supplied in a target period, by a computer; and
determining power demand transition information indicating transition in electrical energy demand in the target period so that the necessary operation time is obtained and the transition in the electrical energy demand generated by the plurality of power-consuming bodies being operated follows the assumed shape, by the computer,
wherein setting the operating startable time point and the operation end target time point comprises setting the operation startable time point and the operation end target time point of each of the plurality of power-consuming bodies using a operation history of each of the plurality of power-consuming bodies,
wherein the computer calculates the electrical energy demand within the target period when a time period included in the target period, in a time period when the power-consuming body is operated, is set to be the longest for each of the plurality of power-consuming bodies, as a maximum electrical energy demand, and calculates the electrical energy demand within the target period when the time period included in the target period, in the time period when the power-consuming body is operated, is set to be the shortest for each of the plurality of power-consuming bodies, as a minimum power demand, using the necessary operation time, the operation startable time point, and the operation end target time point, and
wherein the computer determines first power demand transition information so that the maximum electrical energy demand is obtained within the target period, and determines second power demand transition information so that the minimum electrical energy demand is obtained within the target period.

14. The information processing method according to claim 13,
wherein the shape information is a first function indicating the transition line, and
the computer determines the power demand transition information so that the sum of squares of differences between the first function and the power demand transition information in a state where a negative first constant is added to the first function becomes minimum.

15. The information processing method according to claim 14,
wherein the computer determines the first constant so that the first function is smaller than 0 over the entire target period.

16. The information processing method according to claim 13,
wherein the shape information is a first function indicating the transition line, and
the computer determines the power demand transition information so that the transition in the electrical energy demand follows a function obtained by multiplying the first function by a second constant.

17. The information processing method according to claim 16,
wherein the computer determines the power demand transition information so that the sum of absolute values of differences between the first function and the power demand transition information in a state where a linear function of which a coefficient is negative is added to the first function becomes minimum.

18. The information processing method according to claim 17,
wherein the computer calculates the sum of squares of the differences between the first function and the power demand transition information while changing the second constant, and determines the second constant so that the sum becomes minimum.

19. The information processing method according to claim 13,
wherein the power-consuming body is a rechargeable battery, and the operation is a charging operation of the rechargeable battery.

20. The information processing method according to claim 19,
wherein the rechargeable battery is mounted on an electric vehicle of a plurality of electric vehicles, and
the computer:
sets the operation startable time point and the operation end target time point of each of the plurality of electric vehicles using a traveling history of each of the plurality of electric vehicles, and
sets the necessary operation time of each of the plurality of electric vehicles using a charging history of each of the plurality of electric vehicles.

21. The information processing method according to claim 13,
wherein the computer sets an operation schedule of each of the plurality of power-consuming bodies when determining the power demand transition information, and transmits the operation schedule to each of the plurality of power-consuming bodies.

22. A non-transitory computer readable medium storing a program, the program causing a computer to realize functions comprising:
a function of setting an operation startable time point when an operation is startable, and an operation end target time point which is a latest time point among time points when the operation is to be ended, with respect to each of a plurality of power-consuming bodies that generate power demand;
a function of setting a necessary operation time which is a length of time for performing the operation and which is equal to or shorter than a time from the operation startable time point to the operation end target time point, with respect to each of the plurality of power-consuming bodies;
a function of obtaining shape information indicating an assumed shape of a transition line indicating transition in an amount of power supplied in a target period;
a function of determining power demand transition information indicating transition in electrical energy demand in the target period so that the necessary operation time is obtained and the transition in the electrical energy demand generated by the plurality of power-consuming bodies being operated follows the assumed shape;
a function of calculating the electrical energy demand within the target period when a time period included in the target period, in a time period when the power-consuming body is operated, is set to be the longest for each of the plurality of power-consuming bodies, as a maximum electrical energy demand, and calculating the electrical energy demand within the target period when the time period included in the target period, in the time period when the power-consuming body is operated, is set to be the shortest for each of the plurality of power-consuming bodies, as a minimum power demand, using the necessary operation time, the operation startable time point, and the operation end target time point; and
a function of determining first power demand transition information so that the maximum electrical energy demand is obtained within the target period, and determining second power demand transition information so that the minimum electrical energy demand is obtained within the target period,
wherein the function of setting the operation startable time point and the operation end target time point comprises setting the operation startable time point and the operation end target time point of each of the plurality of power-consuming bodies using a operation history of each of the plurality of power-consuming bodies.

23. The non-transitory computer readable medium according to claim 22,
wherein the shape information is a first function indicating the transition line, and
the computer determines the power demand transition information so that the sum of squares of differences between the first function and the power demand transition information in a state where a negative first constant is added to the first function becomes minimum.

24. The non-transitory computer readable medium according to claim 23,
wherein the computer determines the first constant so that the first function is smaller than 0 over the entire target period.

25. The non-transitory computer readable medium according to claim 22,
wherein the shape information is a first function indicating the transition line, and
the computer determines the power demand transition information so that the transition in the electrical energy demand follows a function obtained by multiplying the first function by a second constant.

26. The non-transitory computer readable medium according to claim 25,
wherein the computer determines the power demand transition information so that the sum of absolute values of differences between the first function and the power demand transition information in a state where a linear function of which a coefficient is negative is added to the first function becomes minimum.

27. The non-transitory computer readable medium according to claim 26,
wherein the computer calculates the sum of squares of the differences between the first function and the power demand transition information while changing the second constant, and determines the second constant so that the sum becomes minimum.

28. The non-transitory computer readable medium according to claim 22,
wherein the power-consuming body is mounted on an electric vehicle of a plurality of electric vehicles, and
the computer further realizes functions comprising:
a function of setting the operation startable time point and the operation end target time point of each of the plurality of electric vehicles using a traveling history of each of the plurality of electric vehicles; and
a function of setting the necessary operation time of each of the plurality of electric vehicles using a charging history of each of the plurality of electric vehicles.

* * * * *